United States Patent
Tilsner et al.

(10) Patent No.: US 6,827,393 B2
(45) Date of Patent: Dec. 7, 2004

(54) VEHICLE BODY HAVING A CENTER CONSOLE CROSS MEMBER

(75) Inventors: Michael Tilsner, Wiernsheim (DE); Michael Wagner, Muehlacker (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 53 days.

(21) Appl. No.: 10/614,181

(22) Filed: Jul. 8, 2003

(65) Prior Publication Data

US 2004/0007899 A1 Jan. 15, 2004

(30) Foreign Application Priority Data

Jul. 13, 2002 (DE) .......................................... 102 31 717

(51) Int. Cl.⁷ ............................................. B62D 25/14
(52) U.S. Cl. ........................... 296/193.02; 296/203.02; 296/192; 296/29; 280/779
(58) Field of Search ............................ 296/70, 72, 192, 296/203.02, 29, 193.02; 180/90; 280/779

(56) References Cited

U.S. PATENT DOCUMENTS

| 4,362,319 A | | 12/1982 | Masaki et al. |
| 4,671,536 A | * | 6/1987 | Yoshimura .................. 280/779 |
| 6,523,878 B2 | * | 2/2003 | Scheidel ...................... 296/70 |

FOREIGN PATENT DOCUMENTS

| DE | 10040824 | 3/2001 |
| EP | 0 479 630 A1 | 8/1991 |

* cited by examiner

Primary Examiner—Joseph D. Pape
(74) Attorney, Agent, or Firm—Crowell & Moring LLP

(57) ABSTRACT

In a motor vehicle, a strut is arranged between the cowl cross member and the center console cross member. The strut is supported in the cowl cross member on a junction element by way of a holder. The junction element includes a profile element and a structural foam part arranged above the latter, which structural foam part swells as a result of a heat treatment, and a precisely fitting filling-out of the interior of the cowl cross member is achieved.

7 Claims, 1 Drawing Sheet

VEHICLE BODY HAVING A CENTER CONSOLE CROSS MEMBER

BACKGROUND AND SUMMARY OF THE INVENTION

This application claims the priority of German patent application 102 31 717.8, filed Jul. 13, 2002, the disclosure of which is expressly incorporated by reference herein.

The invention relates to a vehicle body having a center console cross member.

European Patent Document EP 0 479 630 A1 discloses a strut arranged between a cowl cross member and a center console cross member in the area of a holding device for a steering column of a motor vehicle.

It is an object of the present invention to provide a vehicle body structure configuration having a strut between a cowl cross member and a center console cross member, which strut ensures a rigid connection of a steering column and prevents shaking of the steering wheel.

A principal advantage achieved by the invention is that, by linking the strut to a junction point of the cowl cross member, such rigid support of the steering column is achieved that shaking of the steering wheel is prevented.

This and other objects and advantages are achieved by the vehicle body structure according to the invention, in which the strut is supported on a junction element arranged in the interior of the cowl cross member and on a holder arranged on the exterior side. The junction element fills out the interior cross-section of the cowl cross member in a precisely fitting manner. By providing a junction element that fits precisely into the cowl cross member (that is, rests snugly against all interior surfaces and has no further play), forces can be introduced directly into the cowl cross member.

In particular, the junction element comprises a profile element arranged in a bottom shell of the cowl cross member, and a structural foam part arranged on the profile element in a top shell of the cowl cross member. As a result of so-called swelling after a heat effect, this structural foam part ensures that a junction element is created which fills out the cross-section.

The structural foam part is arranged directly on the profile element, and in an installed condition is arranged with a gap measurement with respect to the top shell of the cowl cross member. In a supporting condition, the heat-expanded structural foam part fills out the shell of the cowl cross member without any gap.

For fastening the strut to the cowl cross member, a holder is provided which is fixedly connected with the bottom shell of the cowl cross member, and a bearing element is fastened to the holder. The bearing element is held by a fastening screw on the strut in a threaded nut. The end of the strut facing away from the holder is connected to the center console cross member, for example, by welding.

The bearing element has a sleeve, which is directly connected with the holder, as well as an axially adjoining compensation element. The sleeve and the compensation element can be connected with one another by way of the through-projecting screw which is fastened to the holder of the threaded nut. By means of the compensation element, possible gap measurements or tolerances between the strut and the stationary sleeve at the holder can be compensated.

According to the invention, the compensation element can be connected with the strut in a premountable manner, and the threaded nut is then fastened on the side of the holder facing away from the compensation element. This simplifies the mounting of the strut in that the compensation element is either fixedly connected with the strut or is held on the strut by means of a clip-type connection.

By fastening one end of the strut by way of the holder on the junction element of the cowl cross member, a rigid linking to the carrier is created. Thus, the steering column held on the center console cross member is stably supported, so that so-called shaking of the steering wheel due to vibrations in the vehicle can be avoided or prevented.

Other objects, advantages and novel features of the present invention will become apparent from the following detailed description of the invention when considered in conjunction with the accompanying drawings.

DETAILED DESCRIPTION OF THE DRAWINGS

Figure 1:
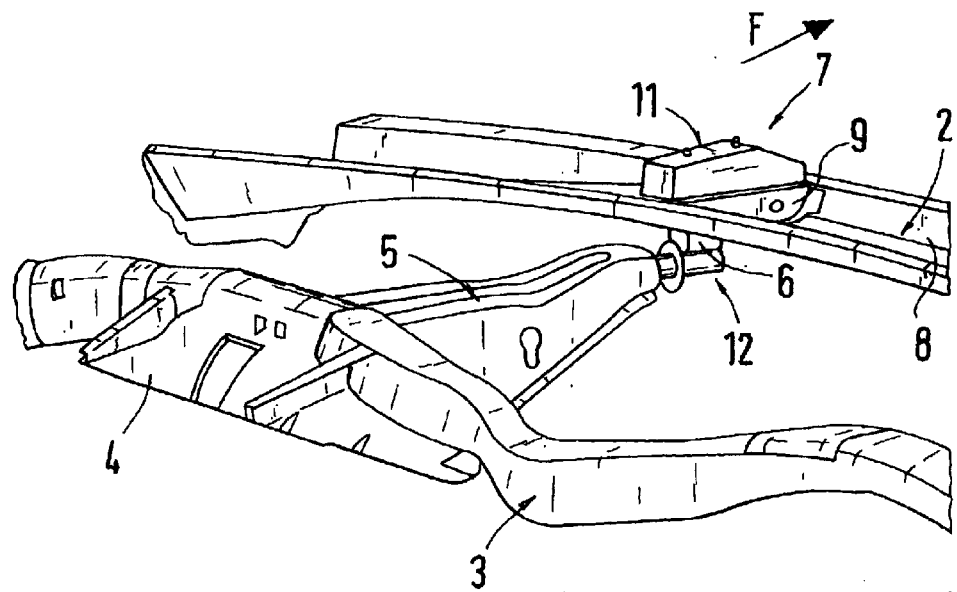
FIG. 1 is a diagrammatic representation of a strut with a bearing element and a junction element, the strut being fastened to the cowl cross member and to the center console cross member.

Referring to FIG. 1, in the body 1 of a motor vehicle—viewed in the driving direction F—a cowl cross member 2 and a center console cross member 3 are arranged on the forward side and can be fastened at their free ends to the vehicle body (not shown in detail). A console 4 for receiving a steering column is provided on the center console cross member 3. A strut 5 arranged between the center console cross member 3 and the cowl cross member 2, is fastened at one end to the center console cross member 3 and can be connected at the other end by way of a holder 6 to a junction plate 7 with the cowl cross member 2.

Figure 2:
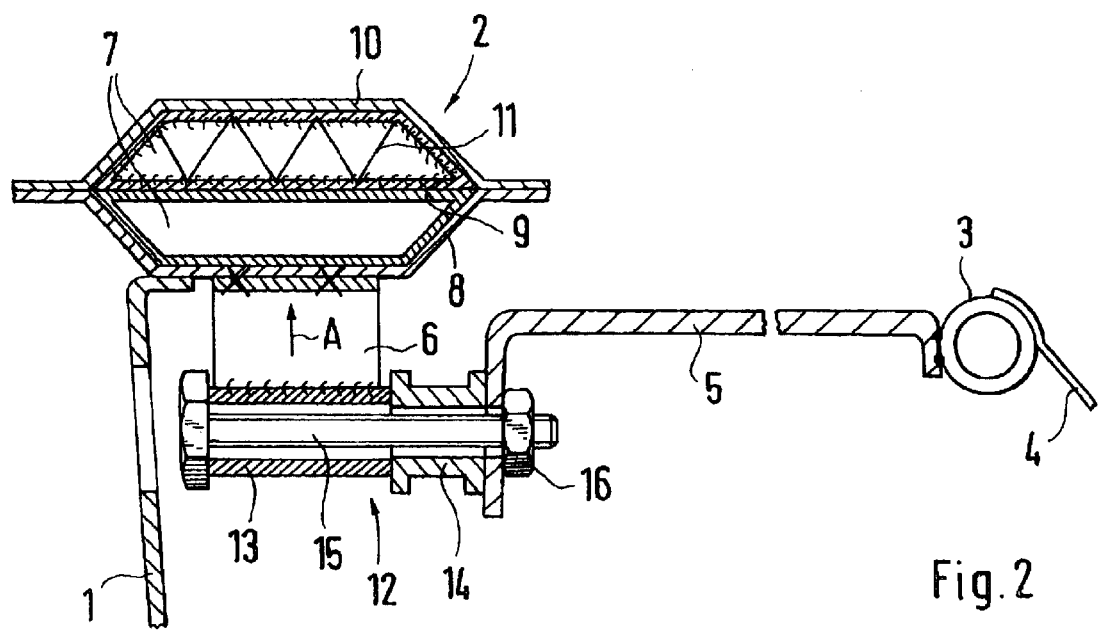
FIG. 2 is a cross-sectional view of the cowl cross member with the center console cross member and bearing element, junction element and strut.

As seen in FIGS. 1 and 2, the junction element 7 is composed essentially of a profile element 9 fastened in a bottom shell 8 of the cowl cross member 2 and of a structural foam part 11 which is arranged above the profile element 9 in a top shell 10 of the cowl cross member 2.

The strut 5 is fastened directly below the junction element 7 by means of a bearing element 12 and the holder 6 connected with the shell 8. The bearing element 12 comprises a sleeve 13, which is fixedly connected (for example, by welding) with the holder 6, and an axially adjoining spacing element 14. The strut 5 is connected with the holder 6 by way of a through-projecting fastening screw 15 which is held in a threaded nut 16. The spacing element 14 can be connected with the strut by a clip-type connection.

The profile element 9 of the junction element 7 is fixedly connected with the bottom shell 8 of the cowl cross member 2. The structural foam part 11 is placed on this profile element 9 and then the top shell 10 of the cowl cross member 2 is placed on the bottom shell 8, and the two shells 8 and 10 are then fixedly connected with one another. In a heat-generating device, a so-called drying furnace, the structural foam part 11 is subjected to a temperature treatment, during which the foam portion of the structural foam part 11 expands so that it fits precisely against the interior surfaces of the shell 10. For this purpose, a small gap of approximately 2 mm is provided between the structural foam part 11 and the interior wall of the shell 10.

By supporting the strut 5 directly by way of the holder 6 on the junction element 7 in the cowl cross member 2, a rigid linking of the strut 5 is achieved in which possible vibrations on the steering wheel of the steering column are suppressed and so-called shaking of the steering wheel is prevented.

The foregoing disclosure has been set forth merely to illustrate the invention and is not intended to be limiting. Since modifications of the disclosed embodiments incorporating the spirit and substance of the invention may occur to persojns skilled in the art, the invention should be construed to include everything within the scope of the appended claims and equivalents thereof.

What is claimed is:

1. A vehicle body structure for a vehicle having a center console cross member for a receiving console for a steering column, and a strut connected between the center console cross member and a spaced cowl cross member of the motor vehicle, wherein:
   the strut is supported on a junction element arranged in an interior of the cowl cross member, via an exterior-side holder; and
   the junction element fills out an interior cross-section of the cowl cross member in a supporting area of the strut in a precisely fitting manner.

2. The body structure according to claim 1, wherein the junction element consists of a profile element arranged in a bottom shell of the cowl cross member; and
   a structural foam part arranged on the profile element in a top shell of the cowl cross member.

3. The body structure according to claim 2, wherein:
   the structural foam part is arranged directly on the profile element; and
   in an installed condition, the structural foam part is arranged with a gap with respect to the top shell of the cowl cross member and, in a supporting condition of the strut, is arranged in a heat-expanded manner inside the top shell while filling it out without a gap.

4. The body structure according to claim 2, wherein:
   the holder is fixedly connected with the bottom shell of the cowl cross member; and
   a bearing element is fastened to the holder, which bearing element is held on the strut via a fastening screw.

5. The body structure according to claim 4, wherein:
   the bearing element comprises a sleeve directly connected with the holder, and an axially adjoining compensation element; and
   the sleeve and the compensation element are mutually connectable by the screw which is fastened to the holder by a threaded nut.

6. The body structure according to claim 1, wherein:
   the compensation element is connected with the strut in a premountable manner; and
   the threaded nut is fastened to a side facing away from the compensation element on the holder.

7. In a vehicle body having a cowl cross member, a center console cross member and a strut connected between said cross members, a rigid connecting element for connecting said strut to said cowl cross member, said connecting element comprising:
   a profile element which has a cross sectional shape that conforms to a cross sectional shape of a bottom shell of said cowl cross member and is fixedly connected thereto; and
   a structural foam part that is arranged on the profile element in a top shell of the cowl cross member; wherein,
   the strut is supported on the cowl cross member at one end thereof, via the connecting element; and
   the connecting element conforms to and completely fills an interior cross section of the cowl cross member.

* * * * *